United States Patent Office 3,331,687
Patented July 18, 1967

3,331,687
ELECTROPHOTOGRAPHIC MATERIAL
Horst Kosche, Duren, Rhineland, Germany, assignor to Firma Render-Belipa G.m.b.H., Lendersdorf-Krauthausen, near Duren, Rhineland, Germany
No Drawing. Filed Sept. 24, 1962, Ser. No. 225,837
13 Claims. (Cl. 96—1.5)

Electrophotography is a term used to denote reproduction processes which make use of the development of latent electric charge images. The electrophotographic material consists, for example, of a support to which an electrophotographic coating containing "photo-conductors" is applied, if desired with the interposition of electrical barrier and/or auxiliary layers. The electrophotographic material is provided with an electrostatic charge in the dark and is then exposed, by conventional photographic processes, to an original, for example, by contact, epidiascopic or projection processes. The result is a latent electrostatic charge image corresponding to the original, and this image is developed by a tribo-electric developer system.

The electrophotographic image produced by the toner can be fixed by known steps, for example by heating, solvent vapours, or by binders, on the electrophotographic material. Non-fixed toner images may be used for image transfer to other preferably sheet, materials of adequate dielectric constant.

Various substances of an inorganic or organic nature have already been proposed as electrophotographically active substances ("photoconductors") for production of the electrophotographic coating, for example selenium, sulphur, zinc oxide, anthracene or aromatic azomethines, arylpyrroles, arylimidazoles, inter alia.

These photo-conductors, are used alone or in combination with binders of insulator character in order to produce the electrophotographic coating.

It has now surprisingly been found that electrophotographic materials of great utility and surprising activity can be obtained if electrophotographically active substances (photo-conductors) corresponding to the general Formulae I-IV are used to produce the electrophotographic coating.

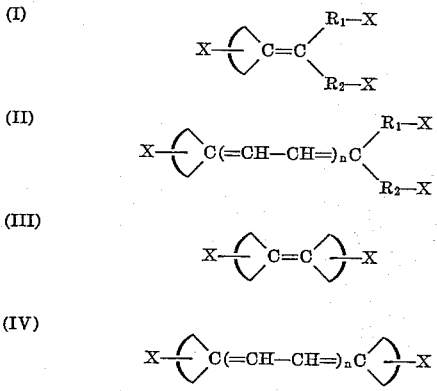

(>C may denote: (a) a condensed ring system derived from at least one benzene ring and at least one unsaturated cyclopentane and/or cyclohexane ring, for example the cyclopentadiene and/or the cyclohexadiene ring, while if desired the aromatic rings and the unsaturated cyclopentane or cyclohexane rings may jointly contain double bonds and carbon atoms, while the said condensed ring system (>C contains at least one reactive methylene group.

(>C may also denote: (b) a heterocyclic ring system which also comprises at least one activated methylene group, for example indene, fluorene, diphensuccinidene, acenaphthene, barbituric acid, thiobarbituric acid, 1,3-diphenylbarbituric acid, benzofluorene, inter alia, at least one methylene group being altered by reaction.

$R_1$ denotes in each of cases (a) and (b): a hydrogen atom or an aromatic or heterocyclic ring system with free electron pairs.

$R_2$ denotes an aromatic or heterocyclic ring system with aromatic properties.

X denotes one or more identical or different substituents, for example —H, —halogen, —CH, —CNS, —OH, —SH, —OR, —SR, —COOH, —COOR, —CO—$NH_2$, —CO—NHR, —CO—$NR_2$, —$NH_2$, —NHR, —$NH_2$, —NHAc, —N—$(Ac)_2$, =S, —$SO_2NH_2$, —$SO_2NHR$, —$SO_2NR_2$, —R, —NH—CO—NHR, —NH—CO—$NR_2$, —O—CO—$NH_2$, —O—CO—NHR, —CO—alkyl, inter alia R denoting a possibly unsaturated aliphatic or an aromatic radical which may also contain selected substituents X.

Ac denotes a preferably organic acid radical of a mono or polycarboxylic acid, for example formyl, acetyl, propionyl, benzoyl, maleinyl, inter alia.

$R_1$ and $R_2$ may belong to identical ring systems in the general Formulae I-IV or may consist of different ring systems containing identical or different substituents X singly or in a plurality.

(>C= may consist of identical or different ring systems.

$n$ denotes a whole number from 1-6.

The photo-conductors corresponding to the general Formulae I-IV according to the invention may be prepared by various methods for example methods known per se. Compounds containing extremely activated methylene groups, for example, fluorene, indene, diphensuccinidene and acenaphthene, are advantageously reacted in alcohols, if desired with the addition of alkalis, with the corresponding aldehydes. The compounds corresponding to the type of Formula III are prepared in a good yield by oxidation of 2 mols of the methylene compounds, for example with lead oxide, or a methylene compound can be reacted by heating with a keto or thioketo compound, if desired with the addition of adjuvant substances which split off water or hydrogen sulphide.

Compounds of Formula I, in which $R_1$ and $R_2$ denote an aryl radical, can be prepared in a good yield by reacting the corresponding thioketone with a compound containing the methylene groups. A further method is to condense the reaction components, for example barbituric acids and aldehydes, by heating in dimethyl formamide with azeotropic removal of the reaction water without the addition of alkalies. The reaction in dimethylformamide is particularly valuable if sensitive aldehydes are to be reacted, more particularly those which become resinous with alkalis, or if the reaction components are very difficult to dissolve in conventional solvents.

The photo-conductors according to the invention are generally colourless to deep-red compounds. Many of them have good solubility in organic solvents while others, as a result of their difficult solubility, may be used as photo-conductors with a pigment character. They are very resistant to thermal stress.

The following table describes a number of compounds suitable as photo-conductors, in accordance with the general Formulae I-IV.

| Formula No. | Compound prepared | Reaction Components | | Melting point | Colour |
|---|---|---|---|---|---|
| | | Reaction of— | With— | | |
| 1 | 9-(4'-dimethylaminobenzylidene)-fluorene. | Fluorene | p-Dimethylaminobenzaldehyde and alkaline NaOH. | 134 | Orange red. |
| 2 | 9-(4'-methoxybenzylidene)-fluorene | do | p-Methoxybenzaldehyde | 130 | Yellow. |
| 3 | 9-(2',4'-dimethoxybenzylidene)-fluorene. | do | 2,4-dimethoxybenzaldehyde | 62 | Orange. |
| 4 | 9-(3'-nitrobenzylidene)-fluorene | do | m-Nitrobenzaldehyde | 149 | Orange-red. |
| 5 | 2-nitro-9-benzylidene-fluorene | 2-nitrofluorene | Benzaldehyde | (¹) | Yellow-brown. |
| 6 | 2-nitro-9-(4'-diethylaminobenzylidene)-fluorene. | do | p-Diethylaminobenzaldehyde | | Red. |
| 7 | 9-furfurylidene-fluorene | Fluorene | Furfurol | | Pale yellow. |
| 8 | 2-nitro-9-(α-pyridinal)-fluorene | 2-nitrofluorene | α-Pyridinaldehyde | 70 | Yellow. |
| 9 | 9-benzylidene-fluorene | Fluorene | Benzaldehyde | 76 | Do. |
| 10 | 9-[di-(4'-dimethylaminophenyl methylene]-fluorene. | do | Michlers thioketone | 237 | Red. |
| 11 | Difluorenylene | do | Lead oxide | 177 | Do. |
| 12 | 9-(4'-ethyl-β-oxyethylamino-benzylidene)-fluorene. | do | p-Ethyl-β-oxyethylaminobenzaldehyde | | Do. |
| 13 | 2,7-dichloro-9-(4'-chlorobenzylidene)-fluorene. | 2,7 dichlorofluorene | p-Chlorobenzaldehyde | 204 | Yellow. |
| 14 | 2,7-dichloro-9-(3'-nitrobenzylidene)-fluorene. | do | m-Nitrobenzaldehyde | 182 | Do. |
| 15 | 2-diethylamino-9-(4-ethyl-β-oxy-ethylaminobenzylidene)-fluorene. | 2-diethylamino-fluorene | p-Ethyl-β-oxyethylaminobenzaldehyde | | Orange. |
| 16 | 9-(2'-nitrocinnamylidene)-fluorene | Fluorene | o-Nitrozimtaldehyde | 229 | Green-yellow. |
| 17 | 2-nitro-9-(4'-chlorobenzylidene)-fluorene | 2-nitrofluorene | p-Chlorobenzaldehyde | 246 | Yellow. |
| 18 | 1-acetamino-3-cinnamylidene-indene | 1-amino-3-cinnamylidene-indene. | Acetanhydride | 267 | Bright yellow. |
| 19 | 3-(4'-dimethylaminobenzylidene)-indene. | Indene | p-Dimethylaminobenzaldehyde | 164 | Orange. |
| 20 | 1-nitro-3-(4'-ethyl-β-oxyethylamino-benzylidene)-indene. | 3-isonitroso-indene | p-Ethyl-β-ethylaminobenzaldehyde | | Red orange. |
| 21 | 1-nitro-3-(4'-nitrobenzylidene)-indene | do | p-Nitrobenzaldehyde | 219 | Red. |
| 22 | 1,2 difluoroenylideneethane | 9-bromo-9-chloro-methyl-fluorene. | Dimethylanilin with heating | 360 | Do. |
| 23 | 9-(4'-ethyl-β-oxyethylamino-9-benzylidene)-diphensuccinidene-(10). | Diphensuccinidene | Ethyl-β-oxyethylbenzaldehyde | (²) | Do. |
| 24 | 9,12-dibenzylidene-diphensuccinidene | 9-benzylidene-diphensuccinidene. | Benzaldehyde | 244 | Deep red. |
| 25 | Dibenzylidene-acenaphthene | 1,2-dioxy-1,2-dibenzyl-acenaphthene. | Glacial acetic acid with heating | 142 | Orange. |
| 26 | Bis-[9-10-dihydroanthrylidene-(9)] | Anthrone | (Reduction in alcoholic conc HCl) | 294 | Do. |
| 27 | 5-(4'-dimethylaminobenzylidene-)-barbituric acid. | Barbituric acid | p-Dimethylaminobenzaldehyde | 279.5 | Red. |
| 28 | 1,3-diphenyl-5-(4'-ethyl-β-oxyethyl-aminobenzylidene)-4-thiobarbituric acid. | 1,3-diphenyl-4-thiobarbituric acid. | p-Ethyl-β-oxyethylaminobenzaldehyde | | Orange. |
| 29 | 1,3-diphenyl-5-(di-4',4''-dimethyl-aminophenylmethylene)-barbituric acid. | 1,3-diphenylbarbituric acid. | Michlers thioketone | 270 | Do. |
| 30 | 3-(4,4'-bis-dimethylaminodiphenyl-methylene)-indene. | Indene | do | | Red. |
| 31 | 5-(3,4-dioxymethylenebenzylidene)-barbituric acid. | Barbituric acid | Protocatechualdehydemethylene ether | 186 / 335 | Yellow. |

¹ Approx. 85, decomposed.   ² Approx. 209.

The following formulae correspond to the formula numbers in the above table:

(1) 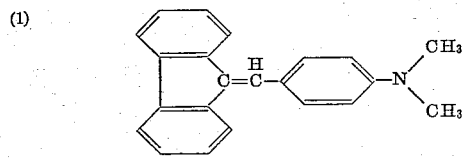

(2) 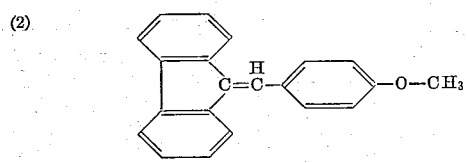

(3) 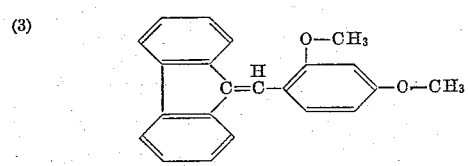

(4) 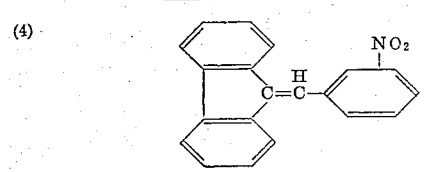

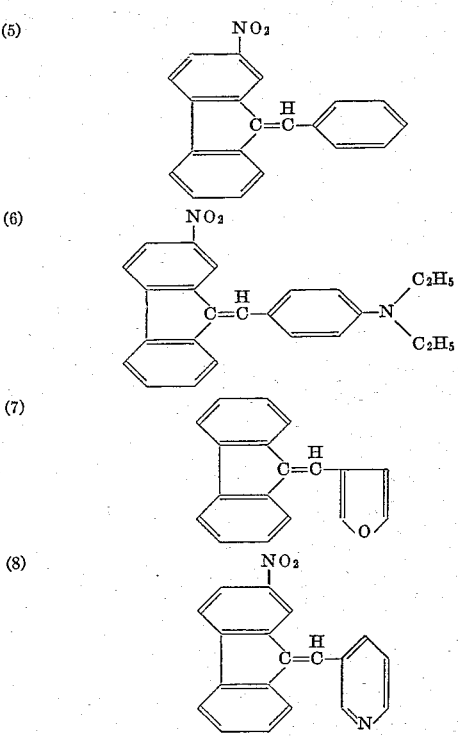

(9) 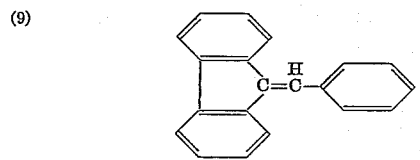
(10) 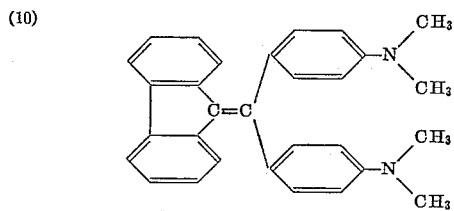
(11) 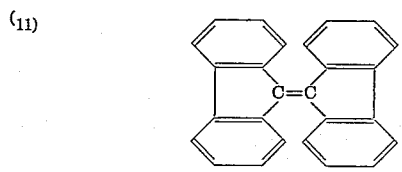
(12) 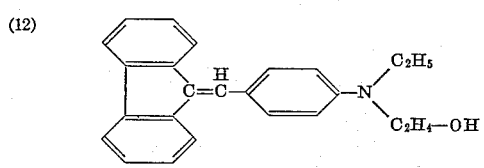
(13) 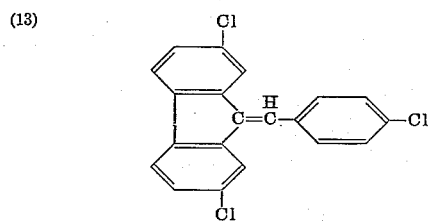
(14) 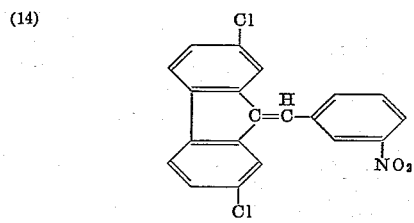
(15) 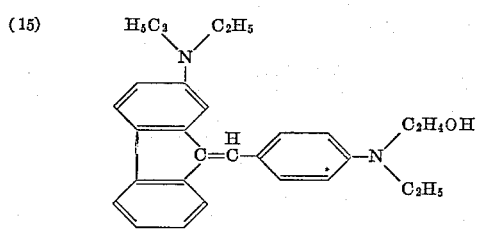
(16) 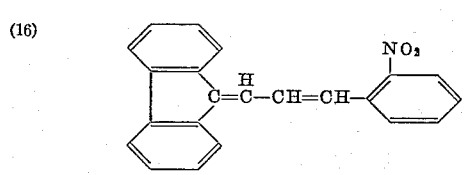
(17) 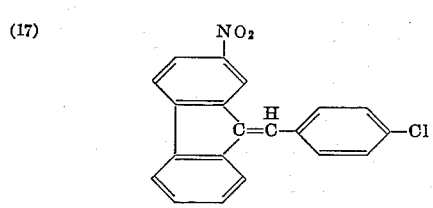
(18) 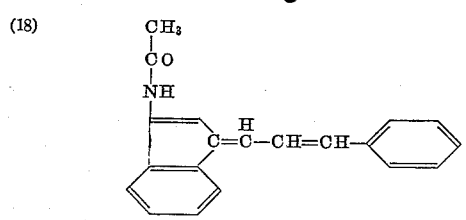
(19) 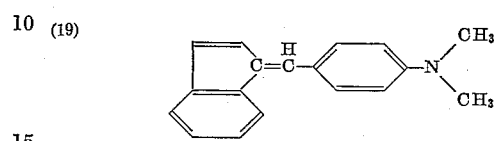
(20) 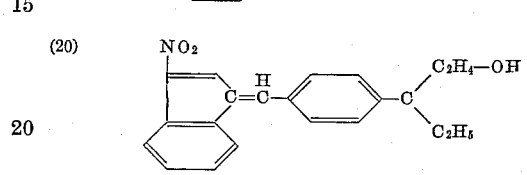
(21) 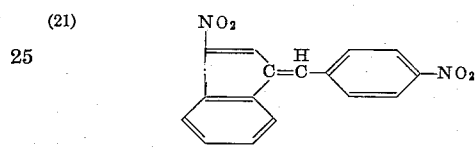
(22) 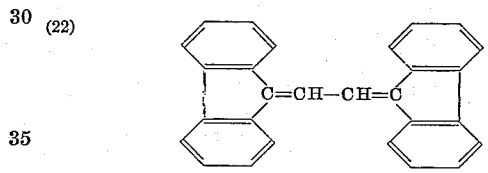
(23)
(24)
(25)
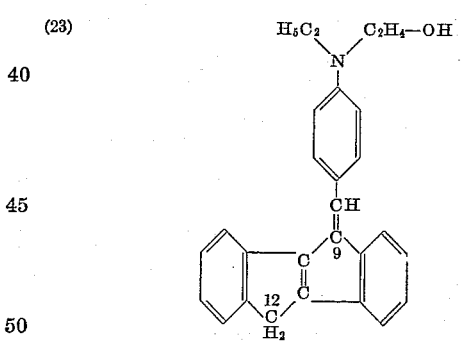

(26) 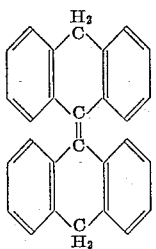

(27) 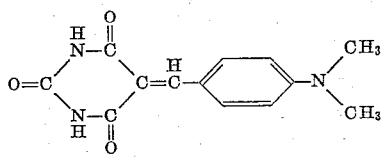

(28) 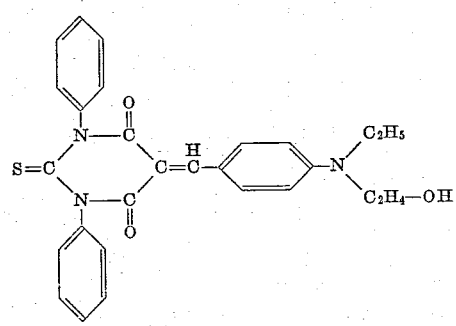

(29) 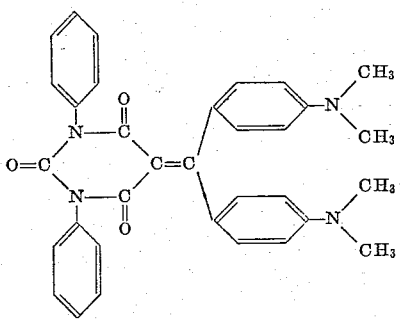

(30) 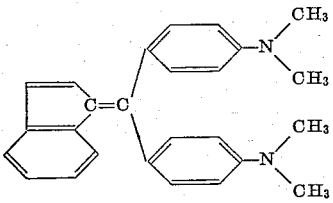

(31) 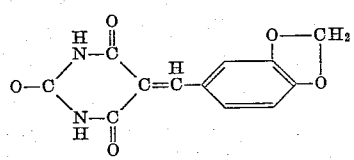

Particularly valuable photo-conductors according to the invention are those which have substituents capable of reacting with organic compounds containing epoxy and/or isocyanate groups. Such substituents are as follows for example: active —H, =O, —OH, —SH, —NH₂, >NH, —NHR, —COOH, —CO—NH₂, —CO—NHR, —SO₂NH₂, —SO₂NHR, —CO-alkyl, the urea, guanide, biguanide, cyanamide, dicyandiamide and other groups, the latter necessarily having at least one reactive H-atom in addition to other substituents.

These photo-conductors are reacted with compounds containing epoxy and isocyanate groups, with molecular enlargement. By the selection of suitable reaction components containing epoxy and/or isocyanate groups it is possible to obtain photo-conductors having excellent adhesive power and high resistance to abrasion while the electrophotographic effect is maintained. These electrophotographic substances produced in this way can be termed "self-adhesive photo-conductors". It is also possible to include in the reaction between photo-conductor and the epoxy or isocyanate compound substances of the kind which although they can react with epoxides and/or isocyanates with molecular enlargement, are not photo-conductors. By incorporating such substances in the molecule of a self-adhesive photo-conductor, for example of mono- or polyalcohols, mono- or polyamines, mono- or polycarboxylic acids, inter alia, it is possible to adapt the self-adhesive photo-conductors to required applications.

The photo-conductors according to the invention which are not reacted to form self-adhesive photo-conductors are used to produce the electrophotographic coating either alone or in conjunction with binders. Photo-conductors soluble in organic solvents are advantageously worked up in a mixture of such binders with a solvent in which both the binders and the photo-conductors, are soluble. The photo-conductors then have low crystallising power and homogeneous coatings are obtained in which the photo-conductors are present as a dispersion in extremely fine particles in the binder. In addition, the photo-conductors according to the invention, particularly those having a pigment character, may be dispersed in aqueous dispersions of synthetic plastics or synthetic resin varnishes in order to produce the electrophotographic coating. The relative proportions of photo-conductor and binder govern the ability of the coating to store the charge and the exposure time, and the thickness of the electrophotographic coating is also a governing factor. The proportions of photo-conductor and binder will generally be 4:1 to 1:4. Electrophotographic coatings of a thickness of 0.003–0.1 mm., more particularly 0.004–0.01 mm. are particularly valuable. It is also possible to embed the electrophotographic coating in a support.

In selecting the binders care must be taken to ensure that the said binders are adapted to the electrophotographic characteristic of the photo-conductor. Binders which themselves contain polar groups and which are able to form an electron donator acceptor complex with the photo-conductor are particularly valuable. The photosensitivity and the stabilisation of the charge in the electrophotographic coating can be considerably increased by this step.

Both natural and synthetic substances may be used as binders for the electrophotographic coating. They may be used in solutions or in aqueous dispersions. If desired, it is possible to add plasticizers, more particularly of the kind adapted to the binder, to the electrophotographic coating.

Alkyd resins derived from phthalic acid and/or maleic acid and polyalcohols, with natural resins incorporated, have proved very suitable and the same applies to the following binders: rubbers, including decomposed or cyclised rubbers, phenolic resins, resorcinol resins, styrenised alkyd resins, purified Manila copal, light dammar resins, cellodammar, shellac resins, aniline resins, silicone resins, polyesters of dicarboxylic acids and polyalcohols, pentaerythrite resins, reaction products—etherified with alcohols or partially esterified with alkyd resins—of ureas and/or aminotriazines with aldehydes, epoxy resins, high-molecular resinous hydrocarbons of aliphatic or aromatic nature, cellulose esters, such as cellulose acetate, cellulose butyrate or cellulose acetobutyrate, cellulose ethers, such as esters of cellulose glycolic acid, methyl celluloses, ethyl celluloses, benzyl cellulose keto resins, coumarone resins, inter alia, sulphonamide resins, resins of heterocyclic nitrogen compounds, such as carbazole resins, polyvinyl compounds, such as polyvinyl acetals, polyvinyl esters, polyvinyl chloride, polyvinylidene chloride, co-polymerisation resins of vinyl compounds with other polymerisable unsaturated compounds, such as copolymers of vinyl chloride and/or maleic acid and/or vinyl acetals and/or vinyl esters and/or vinylidene chloride and/or styrene, unsaturated hydrocarbons inter alia, or polymerisation products, such as, for example, polyacrylonitrile, polyoctyrene and polymeric hydrocarbons, and also aldehyde resins, superpolyamides, polyurethanes, polycarbonates and others.

Various substances are suitable as support for the electrophotographic coating. If support materials of low electrical conductivity are used, the dielectric displacement in the insulator and its interaction with the electrophotographic coating are considerable. The support materials are advantageously made electrically conductive. The following are accordingly suitable, for example, as support materials: metals, synthetic plastics, glass, paper, papers vapour-coated with metals or impregnated with electrolytes, synthetic plastic foils or fabric fleeces, inter alia. Sheet materials are advantageously used as supports for electrophotographic coatings.

The preparation yielding the electrophotographic coating is applied to the support materials by known coating methods and then dried extensively. If absorbent substances are used as support, for example paper, fibre fleeces or others, it is advantageous to coat the same with colloids before the production of the electrophotographic coating so that the thickness of the coating is uniform and to prevent penetration of the coating into the support material.

The electrophotographic coatings consisting, for example, of the photo-conductor alone or a combination of the photo-conductor and a binder, or of self-adhesive photoconductors, having varying photo-sensitivity according to their structure. There is usually an increased photosensitivity in the ultra-violet spectral region up to about 4200 A. On the other hand, some of them have only a minor photo-sensitivity in the spectrum of incandescent light. The photo-sensitivity can be adapted to required light sources, and simultaneously increased, by the addition of sensitizing dyes of the kind conventional in silver halide photography, or other dies of the kind mentioned, for example, in German patent application R 30,222 IVa/57b. 0.1–5%, preferably 0.5–3%, of sensitizers are generally added to the electrophotographic coating. This addition can be increased beyond the amount indicated.

For the production of electrophotographic copies the electrophotographic material is charged, for example, by a corona discharge with a 6–10 kv. negative or positive charge. The material may also be charged by frictional or contact electricity or by introducing the same into an electrical field of a suitable field strength. A corona discharge is preferably used.

The electrophotographic material which has now become photo-sensitive is exposed, according to the spectral sensitivity of the electrophotographic coating, either by mercury high-pressure tubes, arc lamps, impulse discharge tubes, UV fluorescent tubes, or in an incandescent light, a latent electrostatic charge image resulting. The electrostatic charge image is developed by a solid or liquid triboelectric system.

Mixtures of solids used for development consist, for example, of a toner and a toner support brought into intimate contact with the electrophotographic coating. The toner and toner support differ in respect of their dielectric constants. The toner support material used is, in particular, fine-grain substances, for example glass balls, metal powders, plastics-coated glass balls or synthetic plastics, more particularly from the group of condensed aminoplasts. The toners used are preferably fusible natural or synthetic substances or substances of the kind which can readily be made to swell in solvents and dyes, soots, plasticizers and other auxiliaries are added to them. The toner usually has a grain size of 0.5–100μ.

The liquid developer system consists of a liquid having a low electrical conductivity, in which are dispersed a substance suitable as a toner and a synthetic or natural substance which is of opposite polarity to the toner and which is present as a solid or swelling substance in the solvent, if desired with the addition of soluble binders which anchor the toner to the electrophotographic coating.

The developed electrostatic image is fixed by known steps, such as heating, by solvent vapours which cause the toner to swell, or by binders which are contained, for example in liquid developer systems.

A special application of the electrophotographic material is the transfer of the non-fixed toner image to preferably sheet materials in an electrical field or by application of pressure, and the fixing on said materials by known steps.

The transfer sheet will have to have certain properties. Papers are suitable only if their water and salt content is low. The transfer sheet must behave as a dielectric of low electrical conductivity and must also be hydrophobic.

It has been found that papers, woven fabrics, fibre fleeces or cellulose hydrate foils serving to receive the electrostatic toner image by transfer can be improved in respect of their action if their hydrophobic and dielectric properties are increased. This is achieved by impregnating or coating the above materials with synthetic and/or natural substances, more particularly those which give hydrophobic properties and are at the same time capable of combining firmly with the toner either by heating or by the action of solvents. Also valuable are synthetic materials or mixtures threeof with plasticisers of the kind the plasticity of which increases by increase of pressure and which are thus able to bind the toner.

The following are suitable, for example, as synthetic materials for coating or impregnating the above-described support materials: microwaxes, including those containing an addition of polyethylene, montan waxes, synthetic waxes prepared by oxidation, polycarbonates, polyamides, silicone oils or resins, polyesters, such as those formed, for example, from dicarboxylic acids and glycols, cellulose esters, such as cellulose acetate or cellulose acetobutyrate, ethyl cellulose, nitrolcellulose, polyvinyl chloride, polypropylene, polystyrene, polyacrylonitrile, condensation synethetic resins, such as those resulting from the condensation of hydroaromatic or aromatic ketones with one another and/or with aldehydes, such as, for example, cyclohexanone or cyclohexanone and formaldehyde, and many others. These synthetic materials or waxes are applied to the papers in such manner that the hydrophilic character is maintained on the surface. Synthetic material in a proportion of 2–30% of the support weight is generally sufficient. Matting agents, such as finely dispersed silicic acid, finely dispersed zinc oxide, titanium dioxide, diatomaceous earths, and others, may be added to the synthetic materials or waxes in order to increase the ability thereof to receive inscriptions.

A further application of the electrophotographic material is to construct the same as printing form, blocks, plates or the like. For this purpose use is made of a support suitable for printing purposes, and the electrophotographic coating is applied thereto, if desired after application of an intermediate coating which promotes the uniform formation of the electrophotographic coating. An image is then produced on the electrophotographic coating by known steps, the image is fixed, more particularly by heating, and then the electrophotographic coating not used for the production of the image is removed, preferably by solvents which dissolve the electrophotographic coating but not the toner. It is advantageous to add acids, more particularly phosphoric acid or alkalies, for example low aliphatic amines, to the de-coating solution.

The de-coated electrophotographic printing form, plate or block or the like is inked with printing ink together with a supply of water, for example on an offset printing machine. It enables a high run to be made with exact reproduction of the print.

The following examples illustrate the invention:

*Example 1*

2 g. 9-(4'-dimethylamino-benzylidene)-fluorene, in accordance with Formula 1,
0.035 g. Safranin T (Schultz-Farbstofftabellen, Leipzig 1931, 7th edition, Volume 1, No. 967),
1 g. of a synthetic resin formed from condensation of cyclohexanone and formaldehyde (for example the commercial product synthetic resin AFS) are dissolved in
    35 cc. of ethyl acetate and used to produce the electrophotographic coating.

For this purpose the above solution is applied, for example to an aluminium plate having a porous eloxal coating of 2–4 thickness on the surface, and is then dried in a current of hot air until free from solvent. The bright red electrophotographic coating has a high sensitivity in incandescent light.

To produce the electrophotographic image, the electrophotographic material is charged, for example, with a negative corona discharge with a charge of 8–10 kv. and then is exposed under an original, to the light of a 250 Watt incandescent lamp for 5 seconds. After development with the commercial product Graph-O-Fax-Toner 39/50 and glass balls a contrasting electrophotographic image is obtained corresponding to the original. The electrophotographic image is fixed by heating so that it adheres firmly to the support material.

*Example 2*

40 g. of 2-nitro-9-(4'-diethylamino-benzylidene)-fluorene, corresponding to Formula 6,
0.6 g. eosin bluish (Merck),
20 g. of synthetic resin of cyclohexanone and methylcyclohexanone (for example the commercial product synthetic resin AW 2) are dissolved in
    350 cc. of ethylacetate and used to produce the electrophotographic material.

To prepare the electrophotographic material this preparation is applied mechanically to an 80-gram cellulose paper vapour-coated with aluminium, the electrophotographic coating being applied in a thickness of about 0.006 mm. and being dried so as to be free from solvent. The electrophotographic material is highly sensitive to incandescent light.

If the image is then produced as in Example 1, a contrasting electrophotographic image of high resolution is obtained.

*Example 3*

4 g. of di-fluorenyl, corresponding to Formula II, and
3 g. of a modified phenolic maleinate resin (for example the commercial product Beckacite K 115) are dissolved in
    20 cc. of cyclohexanone and
    20 cc. of methylethylketone.

This solution is applied to an aluminium plate which has been given a bright eloxal finish and which has been treated by nickel acetate sealing, so as to give a coating thickness of about 0.006 mm. in the dry state, and is then dried.

A rigidly adhering electrophotographic coating is obtained of orange red colour. The electrophotographic material is highly photo-sensitive in the spectral region of the mercury high-pressure lamp, UV fluorescent tube, and in the shorter-wave components of incandescent light. The electrophotographic coating is given high sensitivity in incandescent light by the addition of 0.2–3% of sensitising dyes, for example bromthymol blue eosin, erythrosine, rose-bengale, fluorescein, rhodamine B., etc.

The electrophotographic plate is charged for a short period with a negative 10 kv. charge and is exposed to light through a microfilm by projection.

For development purposes, a tribo-electric system is used which consists of a toner and a toner support, the toner consisting of an extremely fine grain solid substance containing one or more synthetic resins having a dielectric constant of less than 4 at 1,000 c.p.s., and also, in particular, basic dyes, for example nigrosine, etc., and/or soots.

The toner support used may be glass balls, metal powders, cotton wool, condensed aminoplasts, glass fibres or other substances having a dielectric constant of more than 6 at 1,000 c.p.s.

After development of the electrophotographic image, the image is used for transfer to other sheet materials. For this purpose use is preferably made of synthetic plastic foils, hydrophobic papers and fabric fleeces, more particularly papers or fabric fleeces of the kind pretreated by impregnation or coating with synthetic plastics or waxes having a hydrophobic action.

The transfer sheet is placed on the developed electro photographic plate and then the electrophotographic image is transferred in an electrical field. The transferred image is then secured on the transfer sheet by heating or solvent vapours.

*Example 4*

14 g. of 5 - (4' - dimethylamino - benzylidene)-barbituric acid, corresponding to Formula 27, and
100 g. of a binder combination consisting of:
    60 g. of ethylcellulose N 100,
    120 g. of a hydrogenated colophony resin ester (for example the commercial product Staybelite-Ester 10),
    220 g. of ethanol,
    700 g. of ethylacetate,
    150 g. of butylacetate and
    50 g. of cyclohexanone are dispersed in extremely fine-particle form on a ball mill and then diluted with 0.5 part by volume of ethylacetate.

The dispersion of the photo-conductor present in the form of a pigment is so applied to an aluminium foil having on the surface a porous and spongy eloxal coating of 2.4$\mu$ thickness, as to give an electrophotographic coating of a thickness of about 0.008 mm. The electrophotographic plate can be used after drying. The deepred electrophotographic coating is highly sensitive to incandescent light.

After short-duration charging by a corona discharge with a negative charge of 10 kv. the electrophotographic plate is exposed to a 500 watt Nitraphot lamp at a distance of 50 cm. under an original for a time of 2 seconds, and is then developed according to Example 1 and fixed by heating at 150° C. By subsequent de-coating with a solvent mixture consisting of 10 parts by volume of orthophosphoric acid, 10 parts by volume of methylglycol and 80 parts by volume of ethanol, the electrophotographic plate is converted into a printing form, block, plate or the like.

It is inked with an offset printing ink with a supply of water by the use of printing auxiliaries and enables the print to be exactly reproduced.

The binder combination of Staybelite Ester and ethylcellulose is extremely suitable for the production of printing plates using photo-conductors with a pigment character. As a result of its own fusibility the toner is very satisfactorily anchored to the support material and can be de-coated to give the finest details.

*Example 5*

8.25 g. 2-diethylamino-9-(4'-ethyl-$\beta$-oxyethylaminobenzylidene)-fluorene, corresponding to Formula 15, dissolved in
    20 g. of methyllyclohexanone and
    8.75 g. of a modified tri-isocyanate, produced by partial reaction of 3 mols of toluylenedi-isocyanate with 1 mol of an alcohol containing 3 hydroxyl groups per molecule (for example the commercial product Desmodur I having a molecular weight of 656.667 and the empirical formula $C_{33}H_{32}O_9N_6$ as disclosed in "Bayer-Kinstoffe," 2nd Edition, 1959, page 33, copyright Farbenfabriken Bayer A.G.) 75% by weight in ethylacetate, dissolved in
10 g. of methylcyclohexanone are heated for 5 minutes with reflux after elimination of the ethylacetate.

1.3 g. of 2-ethyl-hexanol are then added and reacted for another 20 minutes at about 160° C.

The self-adhesive photo-conductor in solution is mixed with 15 g. of methylethylketone
15 g. of cyclohexanone and
0.25 g. of eosin bluish (Merck)

and then applied by a centrifuge to an aluminium plate having a bright eloxal finish and having a nickel acetate sealing, so that the resultant solvent-free electrophotographic coating is of a thickness of approximately 0.005 mm. and of uniform formation. A rigidly adhering electrophotographic coating is obtained after drying at 140° C.

The electrophotographic material is sensitive to incandescent light. After exposure and development in accordance with the above example, using the triboelectric system (commercial product Graph-O-Fax-Toner 39/50 and glass beads), a contrasting powdered image of the original is obtained and is fixed by heating at 130° C. The non-fixed powder image can be used for image transfer in accordance with Example 4.

*Example 6*

30 g. of 5-(3'-4'-dioxymethylene-benzylidene)-barbituric acid, in accordance with Formula 31, and
0.8 g. of rose-bengale are ground on a ball mill in
200 g. of the binder combination described in Example 4, so as to give a very fine grain, and 1 part by volume of the dispersion is diluted with 0.5–0.8 part by volume of acetone.

This preparation which forms the electrophotographic coating is then used for the mechanical coating of an 80-gram cellulose paper pre-treated to prevent any penetration by the preparation, a cellulose paper vacuum-coated with aluminium, a synthetic plastics foil vacuum-coated with aluminium, or a commercial offset printing stencil of aluminium (for example the commercial product Rotaprint "Rotablatt E"), so as to produce a coating thickness of 0.006–0.001 mm. in the dry state and is dried.

The electrophotographic material is highly sensitive to incandescent light. After charging in accordance with Example 1 and exposure beneath an original or by projection, development gives a contrasting image of the original.

The electrophotographic material produced by the use of a conventional offset printing stencil is heated to 140° C. after the image has been produced, so that the toner is firmly fixed. The electrophotographic coating is removed and the hydrophilic print support is exposed by treatment with a de-coating solution consisting of 80 parts by volume of ethanol, 15 parts by volume of methylglycol and 5 parts by volume of triethanolamine, and after rinsing with water the support is read for use.

The printing form, block, plate or the like is inked with an offset printing ink with a supply of water. It gives a high run.

What is claimed is:

1. An electrophotographic reproduction material comprising a support and a photoconductive layer, wherein the photoconductor consists essentially of at least one photoconductive compound selected from the group consisting of—

(a)
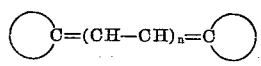

and (b)
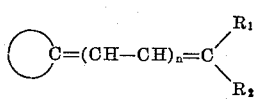

wherein

is selected from the group consisting of condensed isocyclic ring systems with at least one benzene ring and at least one unsaturated cyclopentane ring, condensed isocyclic ring systems with at least one benzene ring and one unsaturated cyclohexane ring, condensed heterocyclic ring systems, and the barbituric acid- and thiobarbituric acid rings, and wherein $R_1$ is selected from the group consisting of hydrogen and aromatic ring systems, wherein $R_2$ is an aromatic ring system, and wherein $n$ is a number from 0 to 6.

2. An electrophotographic reproduction material comprising a support and a photoconductive layer that is capable of being charged electrostatically by exposure to light radiation, wherein the photoconductor consists essentially of at least one photoconductive compound selected from the group consisting of—

(a)
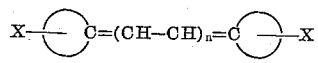

(b)
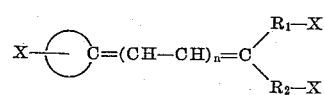

and (c)
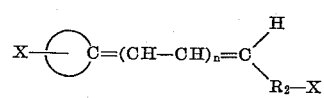

wherein

is selected from the group consisting of the condensed isocyclic ring systems with at least one benzene ring and at least one unsaturated cyclohexane ring, condensed isocyclic ring systems with at least one benzene ring and at least one unsaturated cyclopentane ring, condensed heterocyclic ring systems, and the barbituric acid- and thiobarbituric acid rings, and wherein $R_1$ and $R_2$ are an aromatic ring system, wherein $n$ is a number from 0 to 6, and wherein at least one of the positions designated X in the above formulas is occupied by at least one substituent selected from the group consisting of —alkyl, —aryl, —aralkyl, —aralkylen, —COOH, —CONH$_2$, —CONH-alkyl,

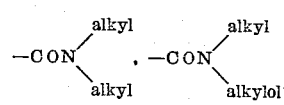

—CN, —CNS, =O, —OH, —O—alkyl, —O—aryl, —O—aralykyl, —NH$_2$, —NH—alkyl, —NH—aryl, —NH—arlkyl, —NH—CO—alkyl, —NH—CO—aryl,

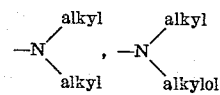

=NH, —NO₂, =S, —SH, —SO₂NH₂, —SO₂NH—alkyl, —SO₂NH—aryl, —SO₂NH—aralkyl,

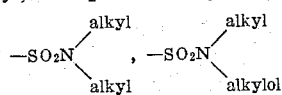

and halogen.

3. The electrophotographic reproduction material of claim 1, wherein said

is selected from the group consisting of indene, fluorene, diphen-succindene, acenaphthene, benzofluorene and derivatives thereof.

4. The electrophotographic reproduction material of claim 1 wherein the photoconductive material is selected from the group consisting of (a)

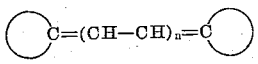

and (b)

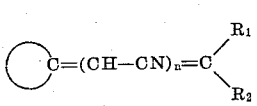

wherein

is selected from the group consisting of condensed isocyclic ring systems with at least one benzene ring and at least one unsaturated cyclopentane ring, condensed isocyclic ring systems with at least one benzene ring and at least one unsaturated cyclohexane ring, condensed heterocyclic ring systems, and barbituric acid and thiobarbituric acid rings, and wherein $R_1$ is selected from the group consisting of hydrogen and aromatic ring systems, $R_2$ is an aromatic ring system and $n$ is a number from 0 to 6.

5. The electrophotographic reproduction material of claim 1 wherein the photoconductive material is selected from the group consisting of (a) 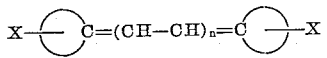

(b) 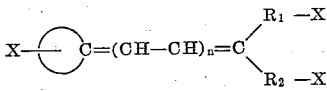

and (c) 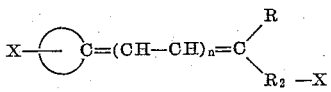

wherein

is selected from the group consisting of condensed isocyclic ring systems with at least one benzene ring and at least one unsaturated cyclopentane ring, condensed isocyclic ring systems with at least one benzene ring and at least one unsaturated cyclohexane ring, condensed heterocyclic ring systems, and barbituric acid and thiobarbituric acid rings, and wherein $R_1$ and $R_2$ are each an aromatic ring system, $n$ is a number from 0 to 6, and wherein at least one of the X positions in the above formulas is occupied by at least one substituent selected from the group consisting of —alkyl, —aryl, —aralkyl —aralkylen, —COOH, —CONH₂, —CONH—alkyl

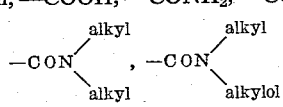

—CN, —CNS, =O, —OH, —O—alkyl, —O—aryl, —O—aralyl, —NH₂, —NH—alkyl, —NH—aryl, —NH—aralkyl, —NH—CO—alkyl, —NH—CO—aryl,

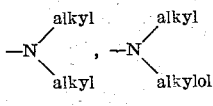

=NH, —NO₂, =S, —SH, —SO₂NH₂, —SO₂NH—alkyl, —SO₂NH—aryl, —SO₂NH—aralkyl,

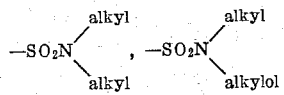

and halogen.

6. The electrophotographic reproduction material of claim 1 wherein the photoconductive compound is represented by the Formula $a$ of claim 1, and wherein ($a$) is

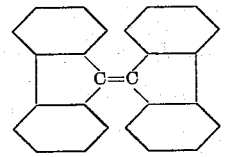

7. The electrophotographic reproduction material of claim 1 wherein the photoconductive compound is represented by the Formula $b$ of claim 1, and wherein ($b$) is

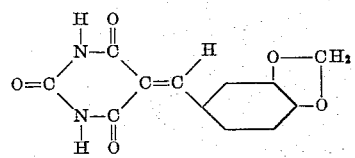

8. The electrophotographic reproduction material of claim 1 wherein the photoconductive compound is represented by the Formula $b$ of claim 2, and wherein ($b$) is

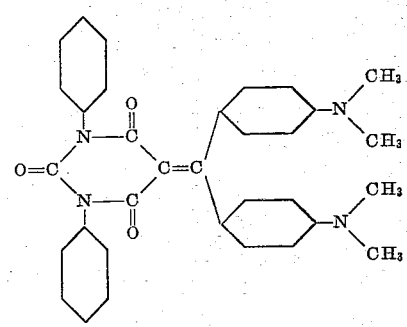

9. The electrophotographic reproduction material of claim 1 wherein the photoconductive compound is represented by the Formula $c$ of claim 2, and wherein ($c$) is

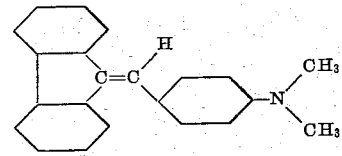

10. The electrophotographic reproduction material of claim 1 wherein the photoconductive compound is represented by the Formula $c$ of claim 2, and wherein ($c$) is

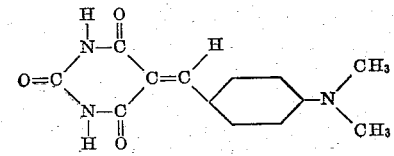

11. The electrophotographic reproduction material of claim 1 wherein the photoconductive compound is represented by the Formula c of claim 2, and wherein (c) is

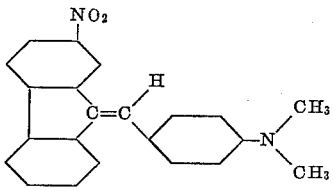

12. An electrophotographic reproduction process comprising electrostatically charging a supported photoconductive layer, exposing under an original to a source of radiation and developing the resulting image, wherein the photoconductor consists essentially of at least one photoconductive compound selected from the group consisting of (a)

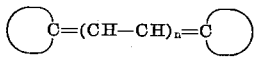

and (b)

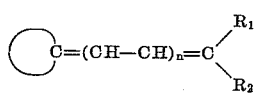

wherein

is selected from the group consisting of condensed isocyclic ring systems with at least one benzene ring and at least one unsaturated cyclopentane ring, condensed isocyclic ring systems with at least one benzene ring and one unsaturated cyclohexane ring, condensed heterocyclic ring systems, and the barbituric acid- and thiobarbituric acid rings, and wherein $R_1$ is selected from the group consisting of hydrogen and aromatic ring systems, wherein $R_2$ is an aromatic ring system, and wherein $n$ is a number from 0 to 6.

13. An electrophotographic reproduction process comprising electrostatically charging a supported photoconductive layer, exposing under an original to a source of radiation and developing the resulting image, wherein the photoconductor consists essentially of at least one photoconductive compound selected from the group consisting of (a)

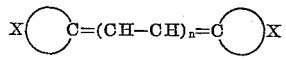

(b)

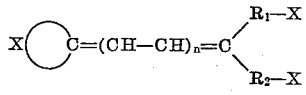

and (c)

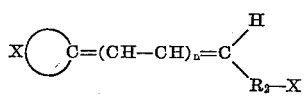

wherein

is selected from the group consisting of the condensed isocyclic ring systems with at least one benzene ring and at least one unsaturated cyclohexane ring, condensed isocyclic ring systems with at least one benzene ring and at least one unsaturated cyclopentane ring, condensed heterocyclic ring systems, and the barbituric acid- and thiobarbituric acid rings, and wherein $R_1$ and $R_2$ are an aromatic ring system, wherein $n$ is a number from 0 to 6, and wherein at least one of the positions designated X in the above formulas is occupied by at least one substituent selected from the group consisting of —alkyl, —aryl, —aralkyl, —aralkylen, —COOH, —CONH$_2$, —CONH—alkyl,

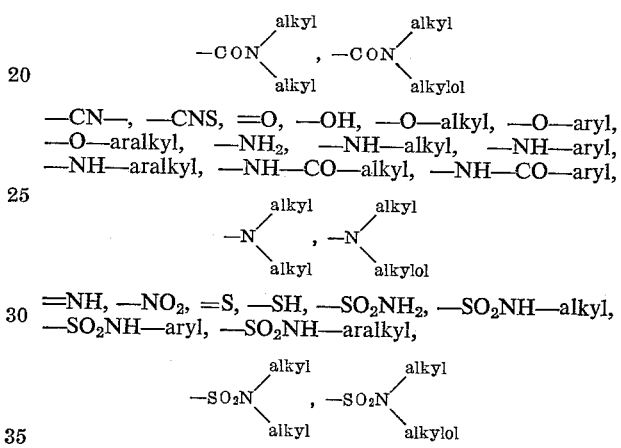

—CN—, —CNS, =O, —OH, —O—alkyl, —O—aryl, —O—aralkyl, —NH$_2$, —NH—alkyl, —NH—aryl, —NH—aralkyl, —NH—CO—alkyl, —NH—CO—aryl, $$-N\begin{matrix}\text{alkyl}\\\text{alkyl}\end{matrix}, \quad -N\begin{matrix}\text{alkyl}\\\text{alkylol}\end{matrix}$$

=NH, —NO$_2$, =S, —SH, —SO$_2$NH$_2$, —SO$_2$NH—alkyl, —SO$_2$NH—aryl, —SO$_2$NH—aralkyl, $$-SO_2N\begin{matrix}\text{alkyl}\\\text{alkyl}\end{matrix}, \quad -SO_2N\begin{matrix}\text{alkyl}\\\text{alkylol}\end{matrix}$$

and halogen.

References Cited

UNITED STATES PATENTS

| | | |
|---|---|---|
| 2,800,559 | 7/1957 | Ubbelhode. |
| 2,872,367 | 2/1959 | Haynes et al. _____ 260—668 |
| 3,041,165 | 6/1952 | Sus et al. |
| 3,114,633 | 12/1963 | Schlesinger. |

FOREIGN PATENTS

| | | |
|---|---|---|
| 562,336 | 5/1958 | Belgium. |
| 597,616 | 11/1960 | Belgium. |
| 885,716 | 12/1961 | Great Britain. |
| 885,717 | 12/1961 | Great Britain. |
| 885,718 | 12/1961 | Great Britain. |

OTHER REFERENCES

Kearns, Electrical Properties of Organic Solids, Univ. of Calif., March 25, 1960, UCRL-9120, UC-Chemistry, TID-4500 (15th Ed.), pp. 7-9.

NORMAN G. TORCHIN, *Primary Examiner.*

T. J. HOFFMANN, C. E. VAN HORN,
*Assistant Examiners.*